Nov. 22, 1955  K. A. HILL  2,724,446

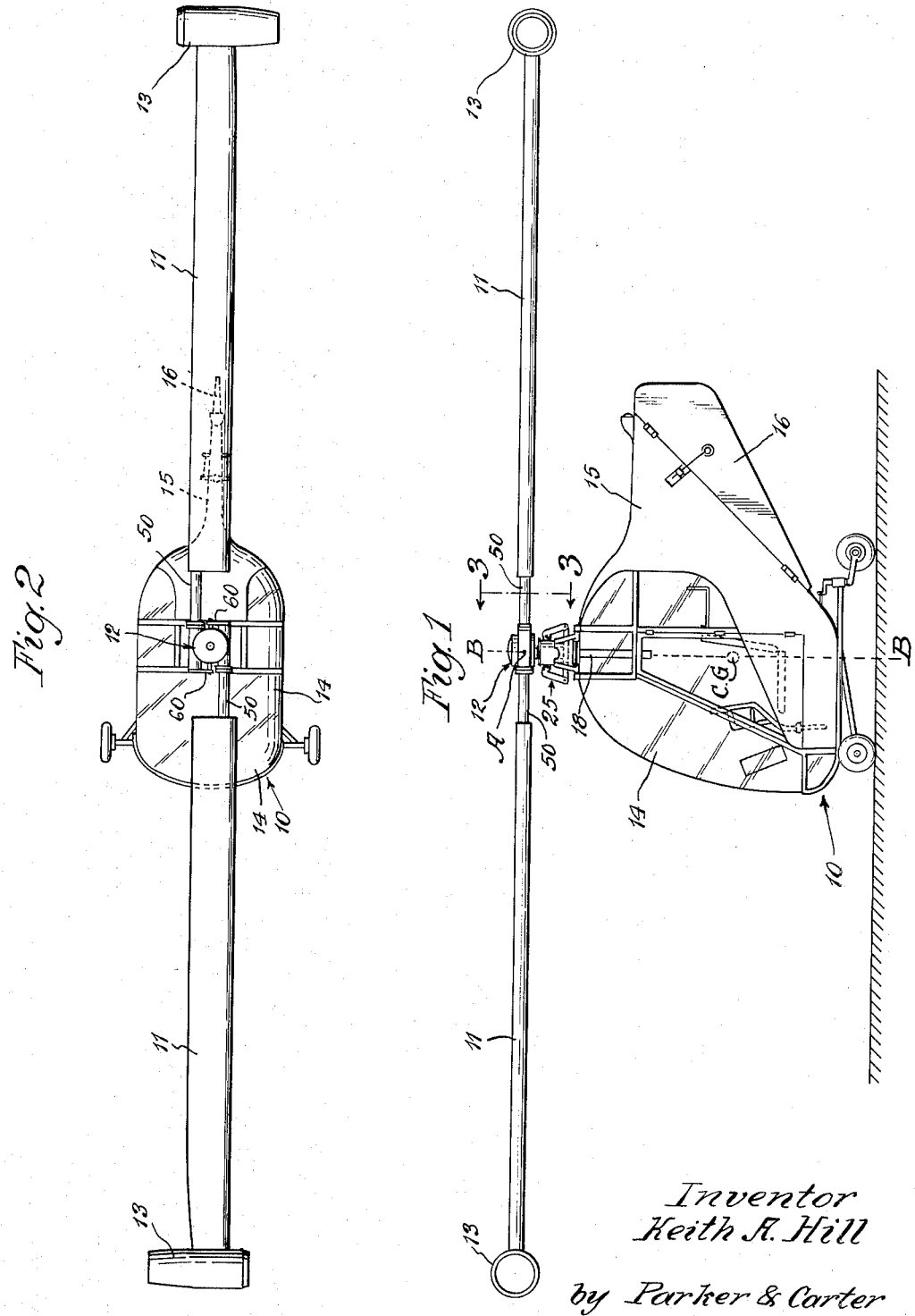

HELICOPTER ROTOR MECHANISM

Filed July 7, 1953  8 Sheets-Sheet 2

Inventor
Keith A. Hill
by Parker & Carter
Attorneys

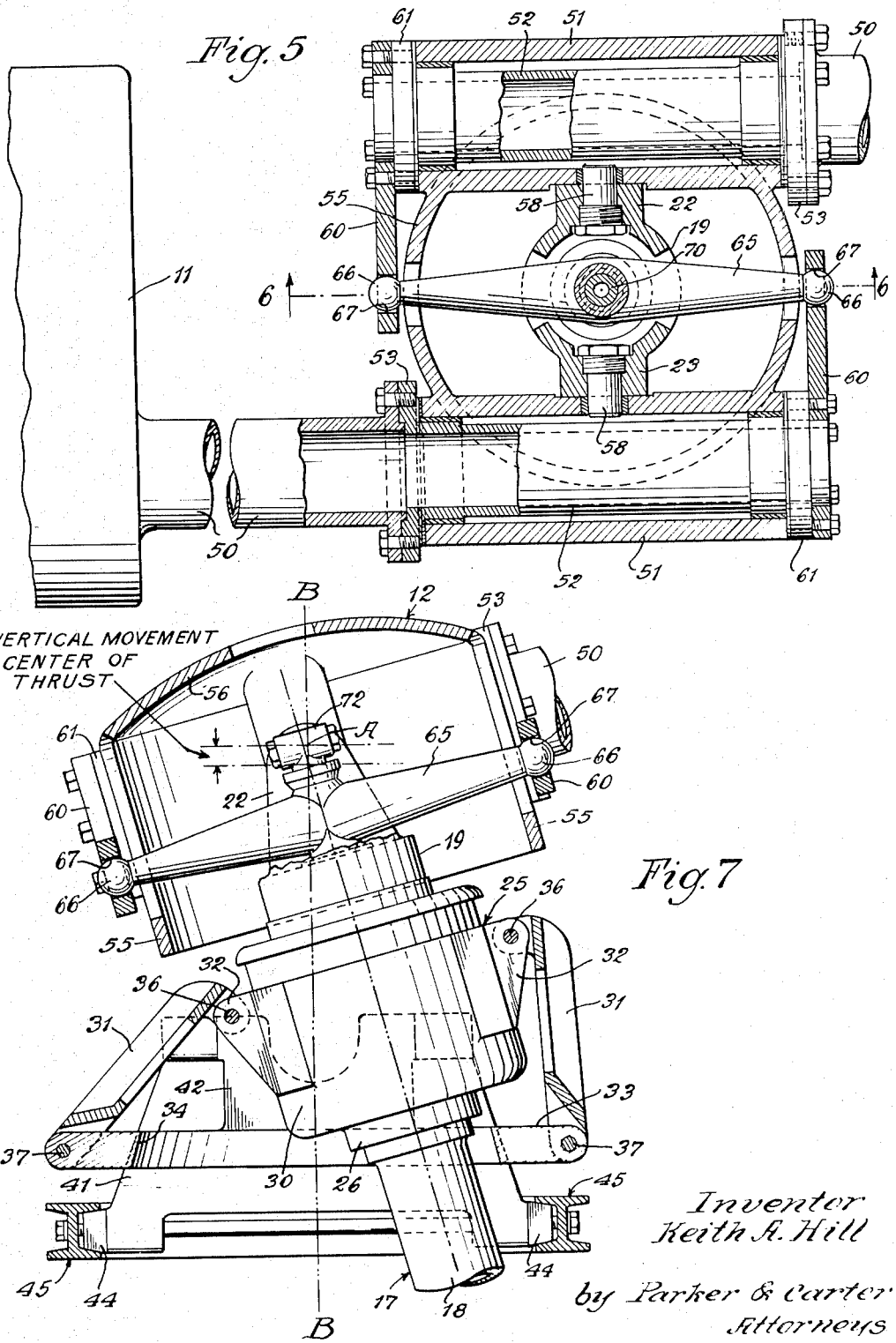

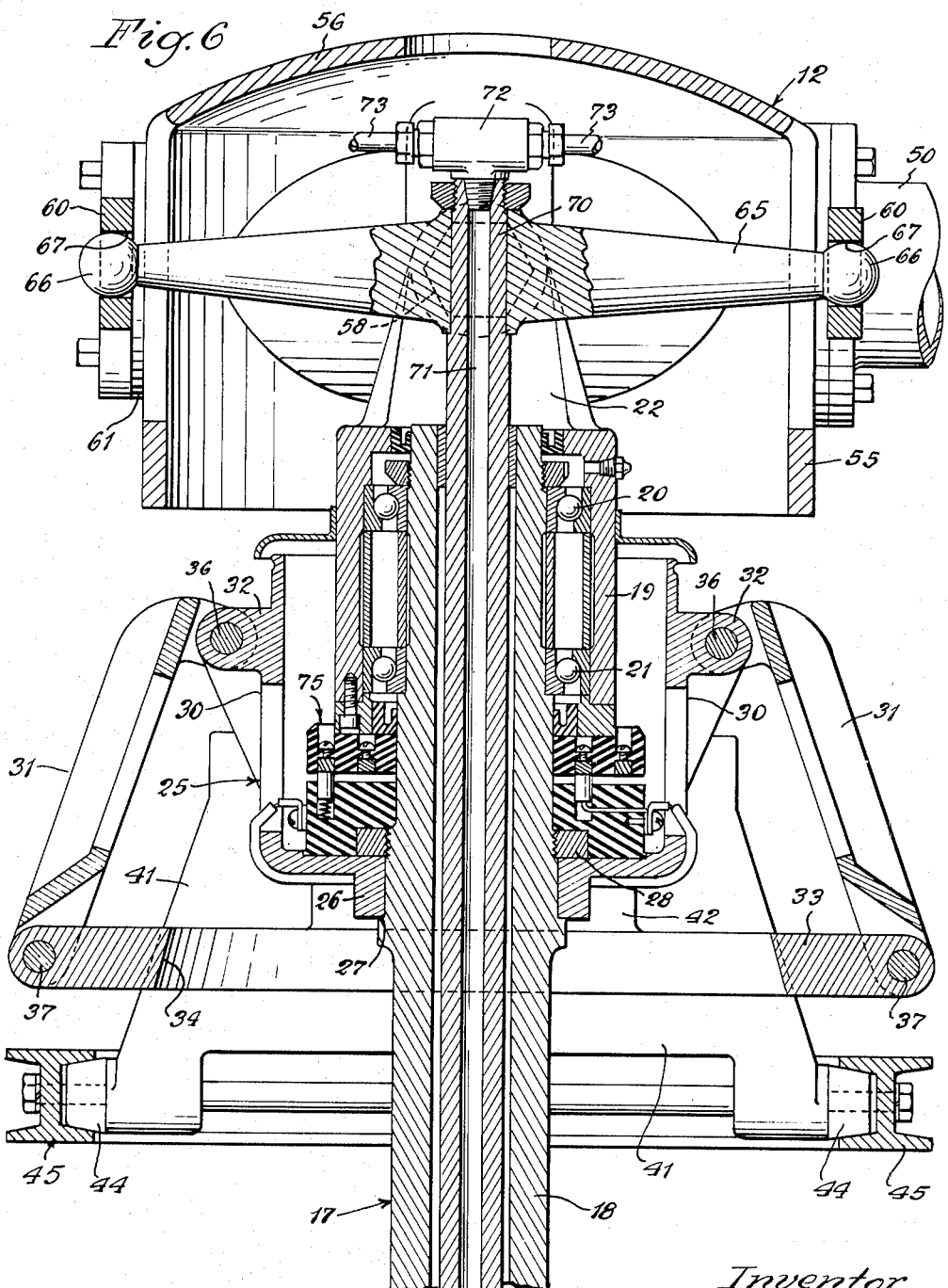

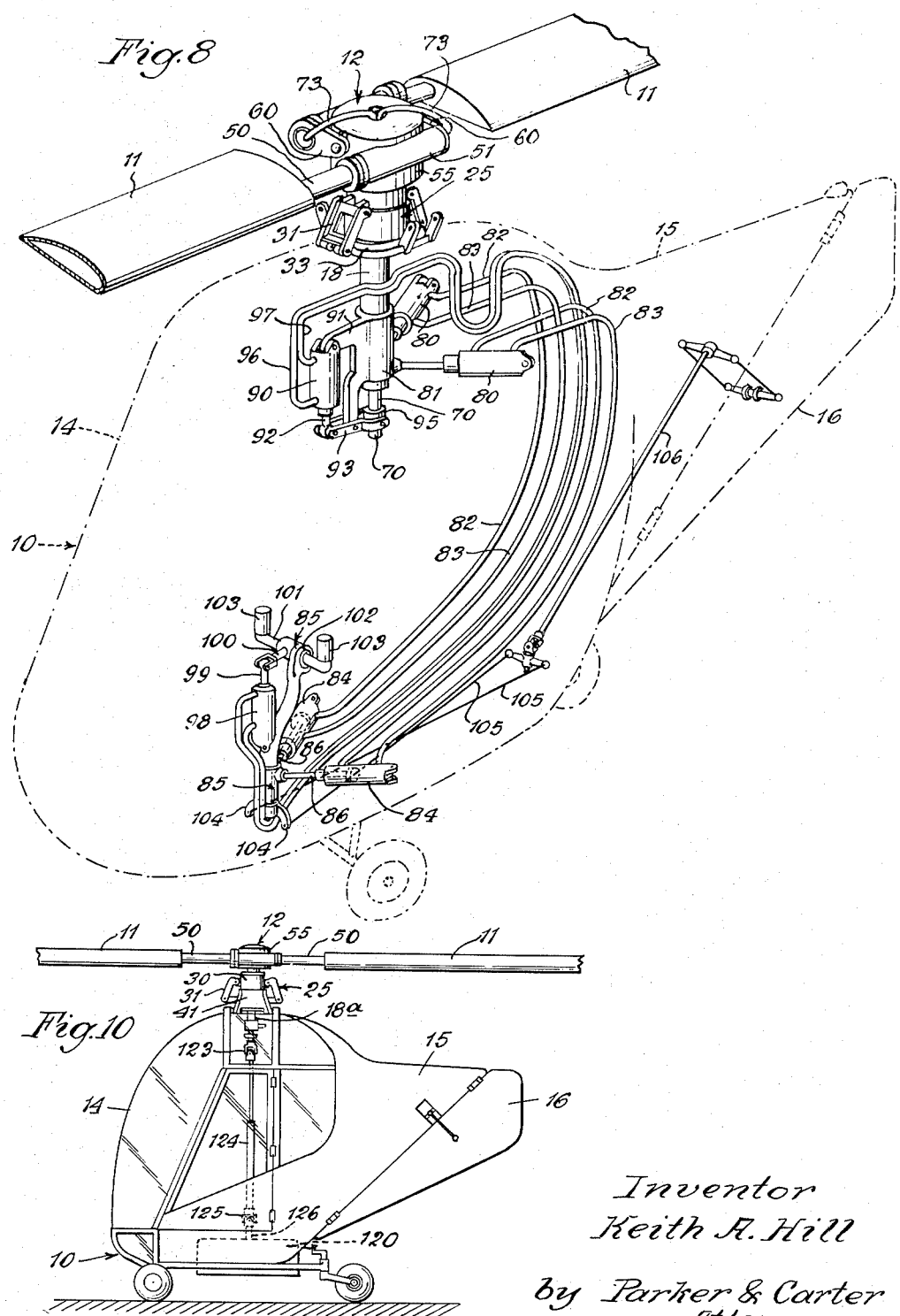

Nov. 22, 1955  K. A. HILL  2,724,446
HELICOPTER ROTOR MECHANISM
Filed July 7, 1953  8 Sheets—Sheet 6
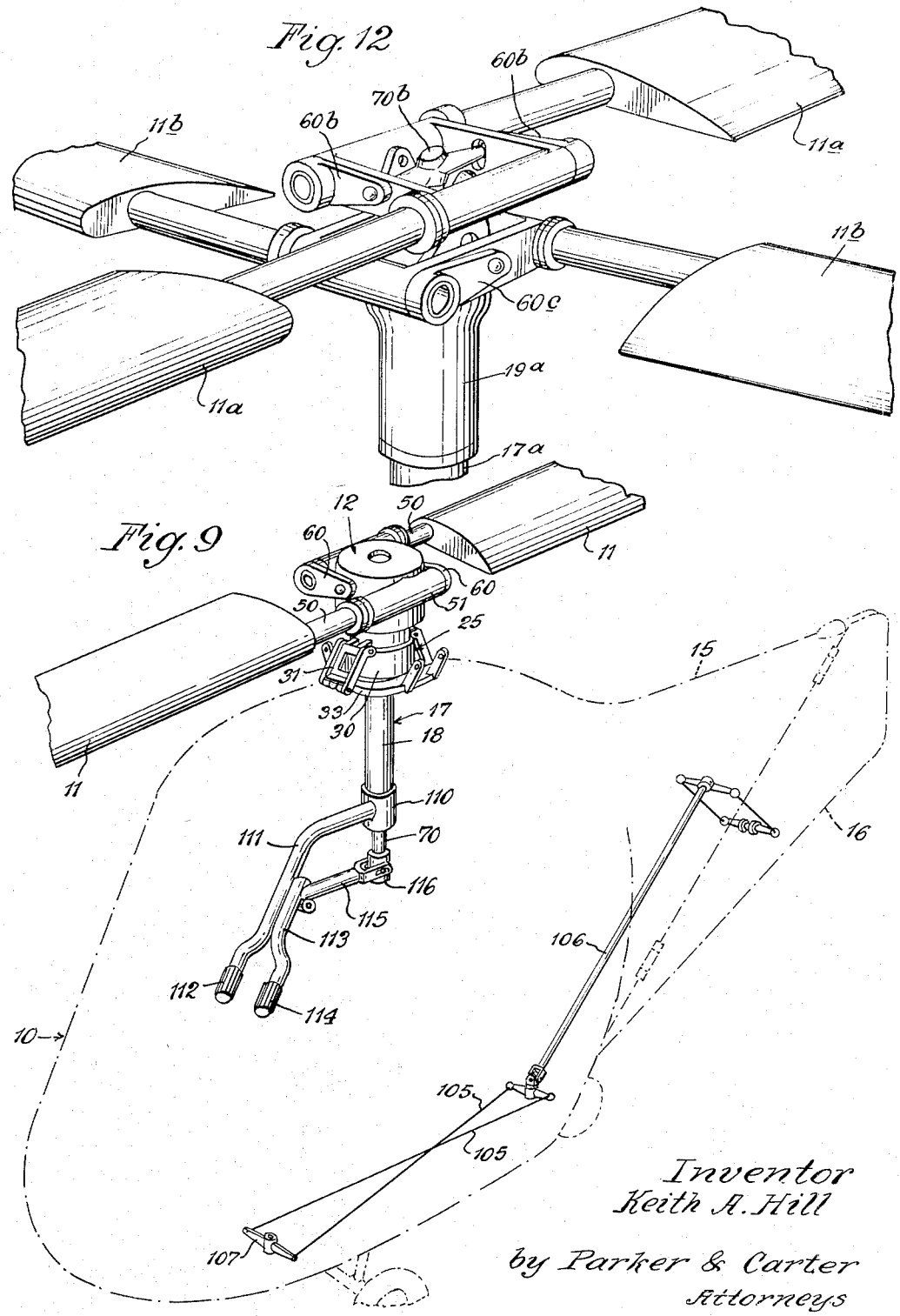
Inventor
Keith A. Hill
by Parker & Carter
Attorneys Nov. 22, 1955  K. A. HILL  2,724,446
HELICOPTER ROTOR MECHANISM
Filed July 7, 1953  8 Sheets-Sheet 7
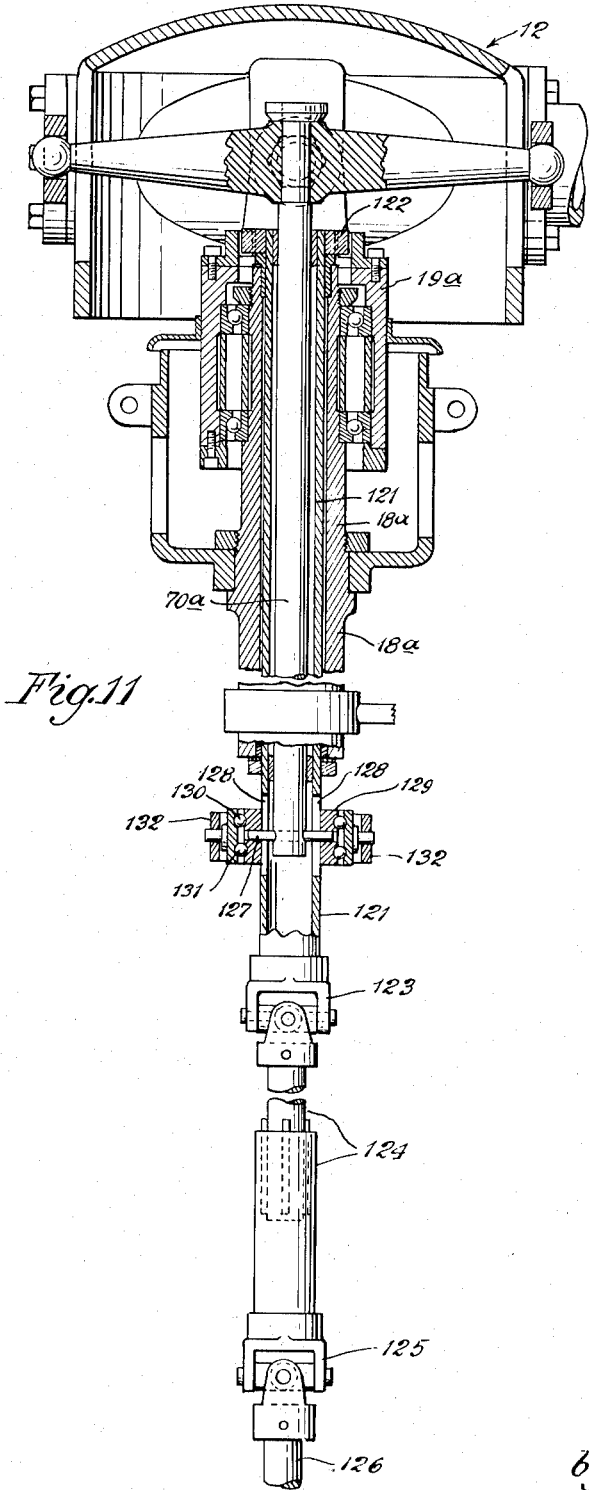
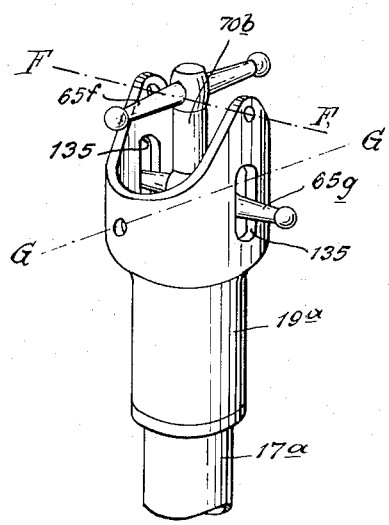
Inventor
Keith A. Hill
by Parker & Carter
Attorneys

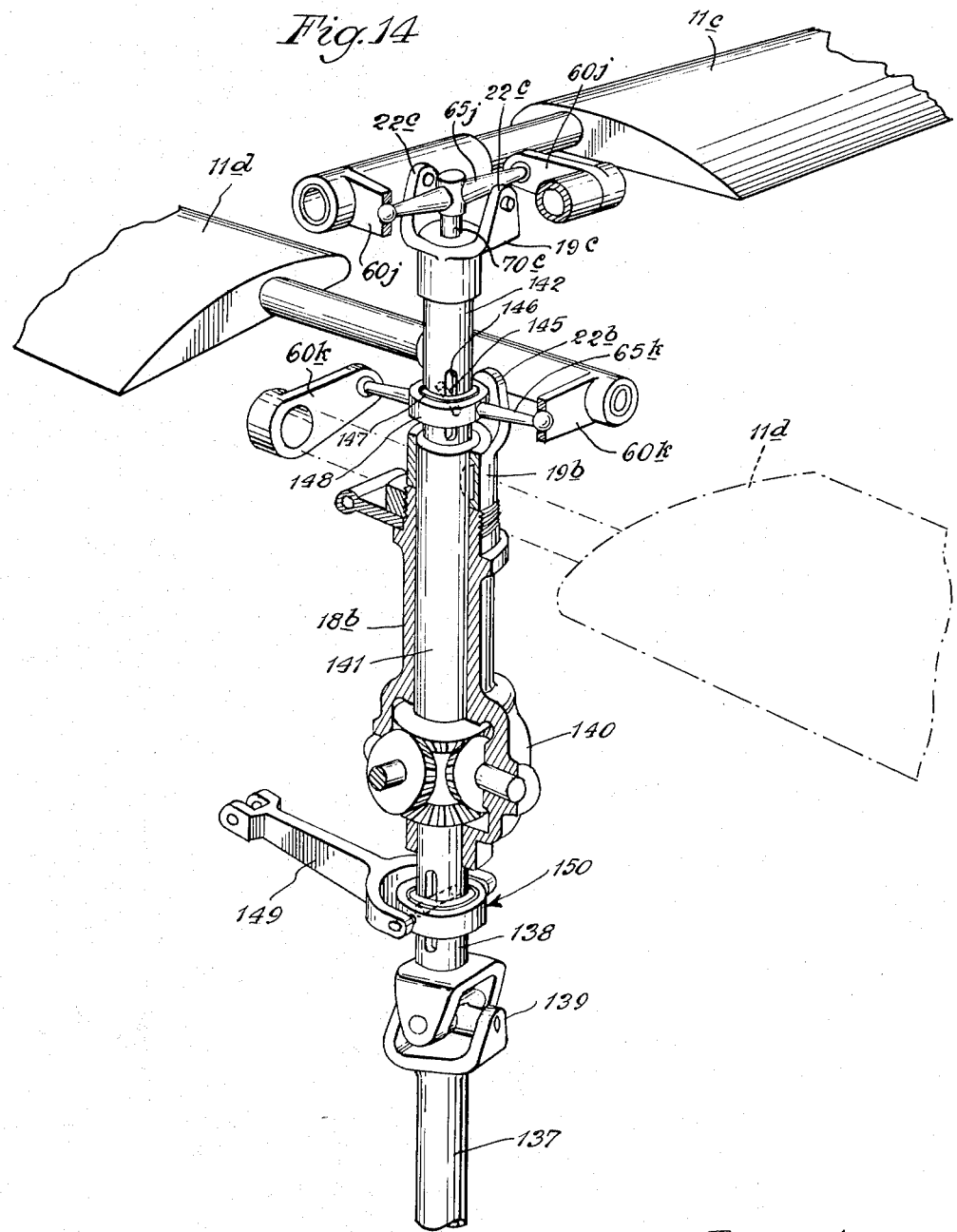

United States Patent Office 2,724,446
Patented Nov. 22, 1955

2,724,446

HELICOPTER ROTOR MECHANISM

Keith A. Hill, Rockton, Ill.

Application July 7, 1953, Serial No. 366,455

14 Claims. (Cl. 170—160.26)

This invention relates to improvements in aircraft of the rotary wing type and is particularly adapted for use in helicopters. It is primarily concerned with the rotor mechanism and means for changing the plane of rotation of the rotary wings and the pitch thereof for various aspects of flight.

Most helicopters employ a rotor mast which is rigidly mounted with respect to the fuselage, although other designs have been proposed wherein the rotor mast is arranged to permit universal tilting action of the rotor under control of the operator. Moreover, in conventional helicopter design, rotor control is usually effected by what is commonly referred to as "cyclic pitch" control, including means for varying the pitch of the blades mechanically several times during each revolution, in order to obtain proper stability and directional control during flight.

One of the objects of the present invention is to provide a rotor mast tiltable in any direction for directional flight under control of the operator, which mast is supported by a novel form of hinge mechanism designed to maintain the effective center of rotor thrust substantially in vertical alignment above the center of gravity of the craft in all permissible positions of tilting movement of the mast.

A further object of the invention is to provide means associated with the rotor hub to afford automatic relative pitch control of opposed blades to adjust and maintain the plane of the rotor substantially at right angles to the mast under normal flying conditions.

Another object of the invention is to provide means associated with the tiltable rotor mast and rotor hub to afford manual control of the average pitch of the opposed rotor blades, yet permitting relative freedom of reciprocal change in pitch of the opposed blades in any position of adjustment of their average pitch, or in any tilted position of the mast, so that the rotor can accommodate itself automatically to any outside force such as a sudden gust of wind, but wherein the rotor will be returned to its proper plane to preserve stability in flight without attention from the operator.

Still another object of the invention is to provide an improved and simplified form of rotor control for directional flight, which eliminates the necessity for any auxiliary tilting means for the fuselage, such as small propellers or the like.

Other objects and advantages of the invention will appear from time to time as the following description proceeds.

The invention may best be understood by reference to the accompanying drawings, in which:

Figure 1 is a view in side elevation of a helicopter constructed in accordance with the invention;

Figure 2 is a plan view of the helicopter shown in Figure 1;

Figure 5 is a section taken generally on line 5—5 of Figure 3;

Figure 6 is an enlarged vertical section taken generally on line 6—6 of Figure 5;

Figure 7 is a view in part section of the rotor mechanism shown in Figure 6, but showing the mast tilted for forward flight;

Figure 8 is a perspective view, in part diagrammatic, of the form of helicopter of Figure 1, but showing details of a hydraulic control system applied thereto;

Figure 9 is a perspective view, in part diagrammatic, somewhat similar to Figure 8, but showing details of a mechanical control system applied thereto;

Figure 10 is a fragmentary side view of a helicopter of the general type shown in Figure 1, but indicating diagrammatically an inboard propulsion motor in place of jet propulsion motors on the ends of the rotor blades;

Figure 11 is a detailed fragmentary section taken longitudinally of the mast head, somewhat similar to Figure 6, but showing a modified form of drive connection from the inboard propulsion motor to the rotor which may be employed in the form of craft shown in Figure 10;

Figure 12 is a fragmentary perspective view showing the application of the invention to a 4-bladed rotor head;

Figure 13 is a detailed perspective view showing the support for tiltably mounting the rotor of the 4-blade type, shown in Figure 12, on the mast;

Figure 14 is a fragmentary perspective view showing the application of my invention to a 4-bladed helicopter, in which two pairs of opposed blades are rotated in opposite directions.

Figure 3:
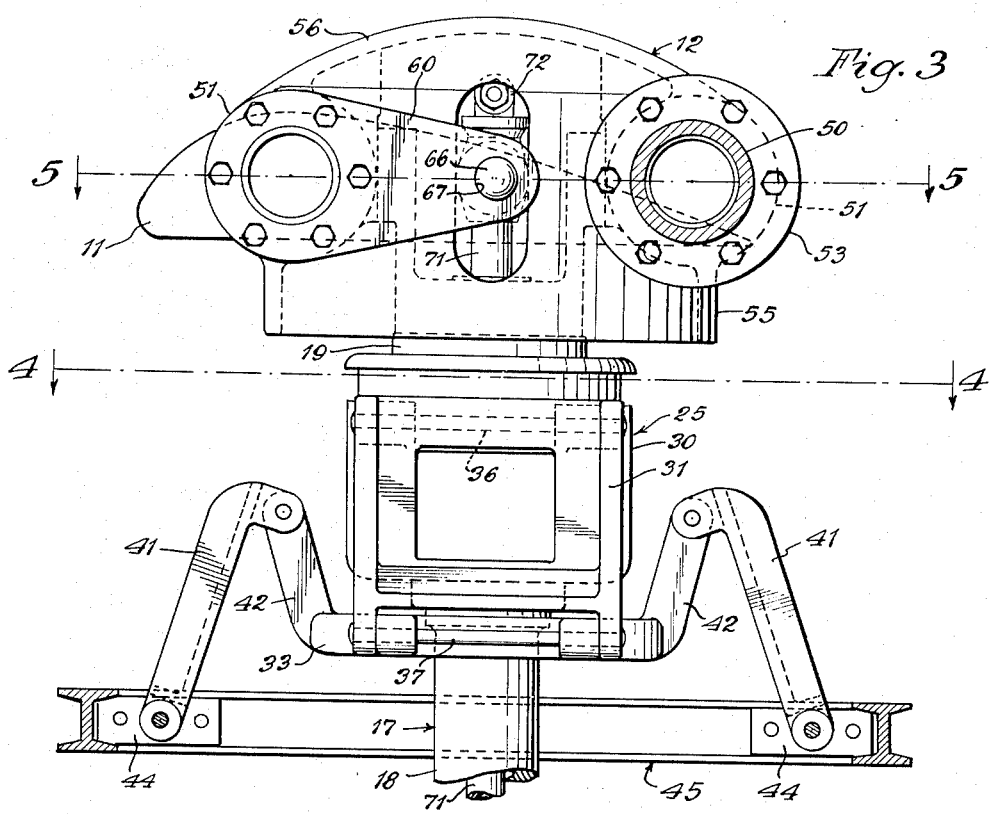
Figure 3 is an enlarged detailed view of the rotor hub mechanism and its hinged mounting, taken generally on line 3—3 of Figure 1.
Figure 4:
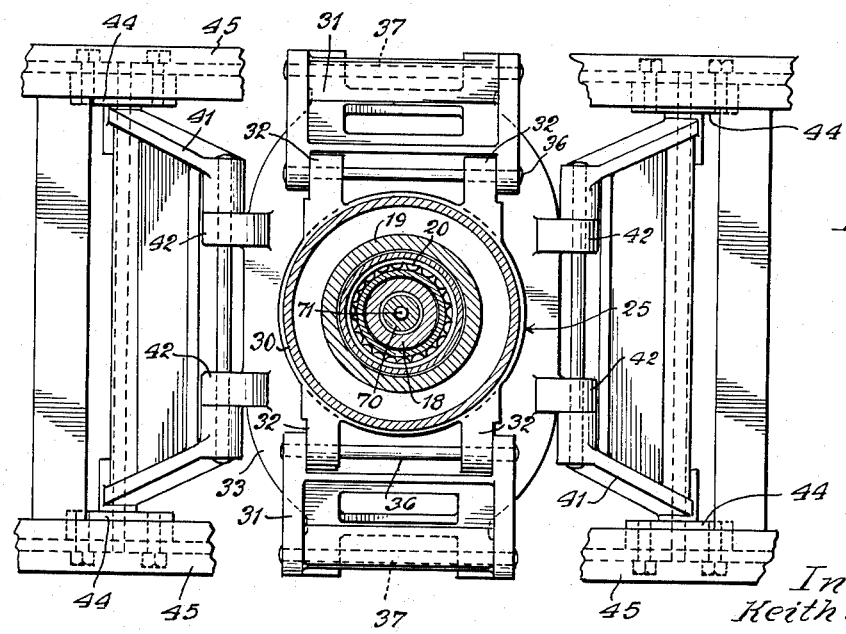
Figure 4 is a fragmentary detailed section taken generally on line 4—4 of Figure 3.

Referring now to details of the embodiment of the invention shown in Figures 1 to 9 of the drawings, inclusive, a helicopter has a fuselage, indicated generally at 10, and a rotor consisting of a pair of opposed rotor blades 11, 11 mounted on a rotor hub, indicated generally at 12, above the fuselage. The rotor is propelled by jet engines 13, 13 carried on the outer ends of the blades, although, as will hereinafter appear, the invention can also be utilized with inboard motor propulsion means.

The fuselage 10 may be of more-or-less conventional shape, including an enclosed cabin 14 for the pilot and one or more passengers, and an attenuated tail 15 with a rudder 16 at its rear end arranged for hinged movement on an upwardly and rearwardly inclined axis. It will be observed, for reasons that will presently appear, that neither the fuselage nor tail has auxiliary lifting means, such as a small propeller, to aid in effecting directional flight, since direction and stability of the craft is controlled entirely by tilting of the rotor relative to the fuselage, and by providing automatic pitch control for the rotor blades.

Referring first to the means for providing directional control of the craft by tilting the mast relative to the fuselage, the rotor hub 12 is rotatably mounted on an upright mast, indicated generally at 17, including a main mast tube 18. The rotor hub is rotatably mounted on the upper end of the mast tube 18 by a cylindrical barrel 19 having a pair of vertically spaced antifriction bearings 20 and 21 at opposite ends thereof (see Figures 5 and 6). A pair of upwardly extending trunnion supports 22, 23 are formed integrally with the upper end of the barrel 19 to provide tilting support for the rotor hub 12 relative to the barrel 19, as will hereinafter be more fully described.

The mast tube 18 is supported on a double-hinge plate structure, including a cradle, indicated generally at 25. Said cradle includes an annular collar 26 through which the tube 18 is fitted and abuts a shoulder portion 27 thereon. A retaining ring 28 is threaded down on the collar 26 to secure the tube to the cradle. The cradle 25 also has upwardly extending cylindrical side walls 30 spaced laterally from the barrel 19. A pair of hinge plates 31, 31 are pivoted to ears 32, 32 on opposite sides of said cradle walls. As will be seen in Figure 6, these hinge plates are normally inclined downwardly and outwardly and are pivotally connected at their lower ends to opposite sides of a yoke 33. Said yoke surrounds the mast tube 18 and has a central aperture 34 providing ample clearance for lateral tilting movement of the mast therein. In the form shown herein, the hinge plates 31, 31 are of considerable width and have their upper corners hinged to the cradle 25. The hinge plates 31, 31 have their lower corners similarly hinged to the yoke 33 by pivot pins 37, 37.

The yoke 33 is pivotally connected by a second pair of downwardly and outwardly inclined hinge plates 41, 41 disposed at right angles to the first-named pair of hinge plates 31. The upper ends of said hinge plates are pivoted to arms 42, 42 formed integrally with the yoke 33, and upwardly inclined to the latter to reduce the overall height of the double-hinge plate structure. The lower hinge plates 41 are pivotally supported at their lower corners on bearings 44, 44 spaced at opposite sides of an open frame, indicated generally at 45. The lower hinge plates 41 are preferably widened toward their lower ends to provide increased stability to the hinge plate structure. The frame 45 forms part of the fuselage framework.

The pivotal connections afforded by the two pairs of hinge plates 31 and 41 permit the yoke 33 to be tilted universally in any direction relative to the fuselage, although the tilting movement of each pair of hinge plates is independent of, and at right angles to, the tilting movement of the other pair of hinge plates. The arrangement is such as to maintain the effective center of thrust of the rotor, indicated at A in Figure 1, substantially in vertical alignment with the center of gravity of the craft, indicated at C. G., in all permissible positions of tilting movement of the mast.

A further advantage of the novel form of double-hinge plate mechanism described above is that, whenever the mast is tilted out of its central vertical position, the center of thrust A of the rotor will be moved downwardly along the vertical axis B—B, including the center of gravity C. G., as indicated in Figure 7. Thus, the center of gravity of the craft will be slightly raised with respect to the center of thrust when the mast is tilted. Accordingly, the mast will always tend to return naturally to its central vertical position when the pilot removes his hands from the manual control devices used in tilting the rotor, with the result that the helicopter will tend to stabilize itself in hovering flight rather than fall off toward one side.

A still further advantage of the tilting mast structure for obtaining directional flight is that the fuselage normally remains in horizontal position while in flight instead of having its nose tipped down or up when going forward or backward, as is common practice with most conventional helicopters.

Further advantages of the tilting mast will appear in the description of the rotor control mechanism which now follows:

In the illustrative embodiment of my invention shown in the drawings, the two rotor blades 11, 11 are positioned substantially at 180 degrees from each other, as shown in Figure 2, in a horizontal plane, but the inner ends of said blades are connected to the rotor hub 12 by short blade roots or shafts 50, 50 journalled in bearing sleeves 51, 51 disposed in parallel equally spaced offset relation at opposite sides of the normal axis of rotation of the rotor hub. In the form shown herein, each blade root has a hollow bearing tube 52 journalled in its bearing sleeve 51, and with a flanged connection 53 at one end to a tubular extension 54 suitably connected to the inner end of its respective blade 11 (see Figure 5). The bearing sleeves 51, 51 of the rotor hub are formed integrally with a generally cylindrical hub housing 55 having a dome-shaped top wall 56.

The rotor hub housing 55 is supported for tilting movement on the trunnions 22 and 23 of the barrel 19 which is rotatably supported on the mast tube 18, as previously described. In the form shown herein, the trunnion support includes a pair of pivot pins 58, 58 secured as by threading their inner ends through the inner faces of the trunnions 22 and 23 and with their outer ends journalled in the side walls of the hub housing 55 on the inner sides of the bearing sleeves 51, 51. It will be especially noted that the pivot pins 58, 58 are disposed on an axis which intersects the two axes of rotation of the blade roots 50, 50 at right angles, so that the hub housing is permitted to tilt with respect to the rotatable barrel 19 on mast tube 18 only at an angle of 90 degrees to the axes of rotation of said blade roots. Moreover, it will be noted that this last-named tilting movement of the rotor hub housing with respect to the mast tube 18 is independent of the universal tilting movement of the mast as a whole relative to the fuselage, permitted by the hinged supporting mechanism, including hinge plates 31, 31 and 41, 41, as previously described.

Each of the blade roots 50, 50 has a pitch control lever 60 attached thereto, in the form shown each such lever being suitably secured to a plate 61 in turn fastened to the free end of the bearing tube 52 of its respective hub root. The inner ends of pitch control levers 60, 60 extend inwardly along opposite sides of the hub housing 55, and engage opposite ends of a cross bar 65 which passes horizontally through the hub housing 55, with its longitudinal axis parallel with the axes of the blade roots 50. In the form shown, the ends 66, 66 of the cross bar 65 are spherically shaped and project into apertures 67, 67 on the ends of the pitch control levers 60, 60.

The cross bar 65 is rigidly attached to a vertical pitch control rod 70 which passes downwardly through and is vertically slidable in the rotor mast 18 (see Figure 6). The cross bar 65, and its rod 70, forms part of the pitch control means for the rotor blades and is actuated through manual control means at the lower end of the rotor mast adapted to be operated from the cockpit of the craft, as will hereinafter more fully appear.

In the detailed showing of the rotor head and its supporting means shown in Figure 6, means are also provided for supply of fuel from the fuselage to the motors 13, 13 at the ends of the blades. Such means includes a hollow duct 71 along control rod 70 with a T-fitting 72 threaded to its upper end, from which a pair of suitable fuel supply tubes 73, 73 are lead through and along the two rotor blades to the jet motors 13, 13, as indicated in Figure 8.

The mechanism shown in detail in Figure 6 also indicates generally at 75 a collector ring assembly to provide electric motor ignition connections between the relatively fixed cradle 25 and the rotating barrel 19 which supports the rotor hub. These electrical connections need not be further described as they form no part of the present invention.

Referring now to certain illustrative forms of manual means which may be employed for controlling the tilting of the mast and average pitch of the rotor blades, a hydraulic type of control system is shown diagrammatically in Figure 8. In this figure, a pair of hydraulic slave cylinders 80, 80 have their pistons flexibly connected as by ball-and-socket joints to a housing 81 fixed to the lower end of the mast tube 18. These cylinders may be arranged substantially at right angles to each other toward the rear of the mast, with their rear ends pivotally connected to a suitable support (not shown) on the fuselage frame. Each of the slave cylinders 80, 80 has two hydraulic tubes 82, 83 connected to corresponding ends of a pair of hydraulic master cylinders 84, 84 associated with a vertical control stick 85 having its bottom end mounted for universal tilting movement near the floor of the cockpit. The pistons 86, 86 of master cylinders 84, 84 are flexibly connected to the upright control stick 85 in the same manner as pistons of the slave cylinders 80, 80 are connected to the housing 81 on the mast tube 18. The arrangement is such that tilting of the control stick 85 in any direction will cause a corresponding tilting movement of the mast tube 18.

Control of the average pitch of the rotor blades is effected hydraulically from the control stick 85 in the following manner:

An upright hydraulic slave cylinder 90 has its upper end pivoted to a forwardly projecting bracket 91 on the housing 81 at the lower end of the mast tube 18. The piston 92 of said cylinder is pivotally connected to a lever 93 having its intermediate portion pivotally connected to a downwardly projecting foot on the housing 81. The forked end of the lever 93 is pivotally connected to a conventional grooved shifting collar 95 fixed on the lower end of the pitch control rod 70. Two hydraulic tubes 96, 97 are connected to opposite ends of the slave cylinder 90 and lead to corresponding ends of an upright master cylinder 98 having its lower end pivotally connected to the control stick 85. The piston 99 of the master cylinder 98 is pivotally connected to a lever 100 fixed to an intermediate part of a shaft 101, mounted for pivotal movement on a transverse axis in a bearing 102 at the upper end of the control stick. A pair of control handles 103, 103 are arranged in upright position at opposite ends of the shaft 101. By swinging the upright handles backwardly or forwardly, the piston 99 of the master cylinder 98 may be raised or lowered to produce a corresponding raising or lowering of the piston 92 of the slave cylinder 90, thus providing any desired vertical adjustment of the pitch control rod 70.

Figure 9 shows a modified form of flight control system of the mechanical type, wherein a sleeve 110 is fixed to the lower end of the mast tube 18 and has an arm 111 extending forwardly and downwardly therefrom, with a control handle 112 at its lower end in position to be manipulated by the pilot for tilting the mast. A second shorter arm 113 is pivotally connected to the first arm 111 intermediate its ends and extends downwardly with its lower handled end 114 spaced laterally from the handled end of said first arm. A pitch control lever 115 is formed integrally with the pivoted arm 113 and extends rearwardly with its forked end pivotally connected to a grooved shifting collar 116 fixed on the lower end of the pitch control rod 70, for controlling the average pitch of the rotor blades.

The rudder 16 at the rear of the helicopter is provided to control the position of the fuselage while in flight. The hinged arrangement of the rudder at an inclined angle to the tail 15 is such as to make use of the downstream from the rotor blades to aid in effectiveness of the rudder. Any suitable means may be provided for rudder control, in the form of control shown in Figure 8 the control stick 85 being provided with arms 104, 104 connected by wires 105, 105 to a control shaft 106 extending rearwardly and connected to opposite sides of the hinged rudder 16. In a modified form of control device shown in Figure 9, a somewhat similar rudder control system is employed, excepting that a pivoted cross arm 107 is independent of the other control levers, in position to be engaged by the feet of the pilot.

The use and operation of the mast tilting and rotor mechanism shown in Figures 1 to 8, inclusive, may now be described as follows:

Assuming that the rotor is being driven by the jet motors 13, 13 attached to the rotor blade tips, the pitch control rod 70 is initially adjusted so that both blades are in normal non-lifting or feathering position. As is common with helicopter flight, the rotor may be maintained at a constant speed at all times during flight. The rotor mast is initially adjusted into its central vertical position. The craft may then be raised in vertical flight by moving the pitch control rod 70 so as to increase the angle of attack or pitch of both rotor blades. Under normal flight conditions, the pitch of the two blades will be equal.

After sufficient elevation has been attained by the craft, the lower end of the rotor mast may be shifted backwardly to tilt the upper end of the mast forwardly, thus placing the mast "out of square" with the initial plane of rotor rotation. It will be understood that the rotor, in rapid rotation, normally behaves somewhat like a gyroscope rotor so as to tend to continue rotation in its initial horizontal plane. Since the rotor hub is attached to the rotor mast by a pivoted joint, it will be seen that tilting of the mast will not immediately cause the rotor to assume a new plane of rotation, yet the angle of attack of the rotor blades is directly effected by the tilting of the rotor mast, due to the operation of the lever 60, 60 and their engagement with the control arms formed by opposite ends of the cross bar 65 on the mast, as may be explained as follows:

As each blade passes over the nose of the ship during rotation, its angle of attack is automatically reduced so as to tend to deflect said blade downwardly. As the blade passes over the tail of the ship, it is automatically shifted to an increased angle of attack with a resulting tendency to fly upwardly. It will also be noted that, when the two blades are at right angles to the center line drawn from front to rear of the ship, they will then tend to be the identical angles of attack and tend to stay horizontal. This action is produced by the cross bar 65 on the mast, which engages the pitch levers 60, 60 attached to the root shafts 50, 50 of the two blades. Since the cross bar is always maintained at right angles to the mast and extends transversely of the axis of tilt of the rotor head, and since the angle of attack of the rotor blades is controlled by the cross bar, it will be seen that the pitch of both blades will be equal only when the rotor is rotating at right angles to the mast. Thus it follows that when the mast is tilted forwardly (or in any direction) for directional flight, the rotor hub will not be forced positively to change its plane of rotation, because during the relatively slow tilting movement of the mast, the rotor hub will revolve into an angular position where the pivot 58 is not at right angles to the direction in which the mast has been tilted. When this occurs, the rotor hub and blades will tilt on the pivot pin because of their tendency to continue rotation in their initial plane, as previously mentioned. This tilting tendency will continue while the hub and blades are rotated through 180°; that is to say, until the pivot pin again reaches a point where it is in line with the direction of mast tilt. It will be noted, however, that when the hub and blades are tilted during this one-half turn, the pitch control mechanism automatically causes the blades to change their pitch so as to fly themselves immediately into a new plane of rotation substantially at right angles to the rotor hub. If the plane of rotation of the rotor head is restored to its initial right angle position relative to the mast, the pitch of the two blades again becomes equal and remains so as long as the right angle relationship to the mast is maintained.

Should any outside force, such as a sudden gust of wind, tend to deflect the rotor either when in tilted or central upright position relative to the mast, the automatic pitch control, effected through the cross bar 65 and the pitch levers 60, 60 on their rotor blade root shafts, will return the rotor automatically to the proper plane of rotation.

The automatic pitch control means just described also makes it possible to accommodate the angle and pitch of the blades to unusual conditions. For example, if the normal lift of one blade should be accidentally reduced as by shell fire or other damage, the automatic pitch control operates to increase the pitch of the damaged blade while correspondingly decreasing the pitch of the other blade, thus tending to preserve equal lift on both blades.

It will now be understood that the novel mounting of the two rotor blades on the rotor hub is such as to afford considerable flexibility, both as to their relative pitches as well as their angles relative to the mast, whereby they can accommodate themselves automatically to varying conditions of normal flight, as well as to unusual or accidental flight conditions such as a sudden gust of wind or damage to one of the blades, all without conscious attention from the operator.

A further advantage attained from automatic pitch control when the mast is tilted for directional flight is as follows:

Assuming, for example, that the rotor is rotating in a counter-clockwise direction when viewed from above, and the speed of rotation at the rotor tips is approximately 400 M. P. H.; if the helicopter is in forward flight at a speed of 50 M. P. H. air speed, it will be seen that the rotor blade, which is advancing into the air stream, will have an actual air speed of 450 M. P. H., while the blade, which is retreating from the air stream, will have an actual air speed of only 350 M. P. H. This being the case, unequal lift on the two blades will be developed unless some means is provided for compensation.

In conventional helicopters employing so-called cyclic pitch control systems, cam means are provided for reducing the pitch of the blades on the side which is advancing into the air stream, and for increasing the pitch of the blades on the retreating side. As a result of such cyclic pitch control, the pitch of the two blades must be constantly changed mechanically as they rotate at approximately six or seven revolutions per second. With the improved tilting mast principle and automatic pitch control of the present invention, the difficulties inherent in conventional cyclic pitch control are eliminated in the following manner:

Assuming that the mast is tilted forwardly and the plane of rotor rotation is at substantially 90 degrees to the mast and the helicopter is moving forward horizontally, it will be seen that the pitch of the rotor blade, which is advancing, is brought into a more nearly parallel relation with the direction of flight than the other retreating blade, even though their pitch is identical relative to the rotor mast. This practically eliminates the requirement of constant mechanical oscillation of the blades during rotation necessary with conventional cyclic pitch control systems. It further insures approximately equal lift on both sides during forward flight. If however, in forward flight, the lift is not quite equal on both sides, the following automatic pitch correction is effected:

Should the advancing blade deliver more lift than the retreating blade, this will cause the advancing blade to fly higher than the retreating blade. Since this movement places the plane of rotation out of 90 degrees with the mast, the automatic pitch control mechanism reduces the pitch of the advancing blade and increases the pitch of the retreating blade and a balance is automatically established between the two blades but with the plane of rotation of the rotor tilted slightly toward the side of the retreating blade. This may cause the helicopter to fly slightly off course, but this can be readily corrected by the pilot by shifting the rotor mast sideways enough to correct this small drift, thus returning the craft to its intended course.

In general however, it may be said that the helicopter will fly in whatever direction the rotor is tilted; therefore, the tilting mast will permit flight in any direction. In order to descend, the average pitch of the rotor blades is decreased and the helicopter will then return to earth in a manner normal to craft of this type.

Figure 10 shows diagrammatically a modified form of craft wherein an inboard motor 120 is permanently mounted within the fuselage and has flexible driving connections through the tilting mast to permit universal tilting movement of the latter. Details of these flexible driving connections are shown in Figure 11, wherein a hollow drive shaft 121 extends through the mast tube 18a, corresponding to the mast tube 18 of Figure 6. The upper end of the drive shaft 121 is splined at 122 to the upper end of barrel 19a rotatably mounted on the upper end of the mast tube.

The lower end of the hollow drive shaft 121 is connected by universal joint 123 to a splined telescopic shaft 124 having its lower end connected by a second universal joint 125 to the power shaft 126 of the inboard motor. The tilting of mast 18a may be controlled by suitable mechanism such as shown in Figures 8 or 9.

Average pitch control means for the blades is provided by a rod 70a, corresponding in function to pitch control rod 70 in Figure 6, passing concentrically downwardly through the hollow drive shaft 121 and having a cross pin 127 connected at its lower end, which passes through opposed slots 128, 128 formed in the sides of the hollow drive shaft below the lower end of the mast tube 18. The outer ends of the cross pin are fixed in an annular sleeve 129 surrounding the drive shaft. Said sleeve is rotatably supported by an antifriction bearing 130 in a shifting collar 131 arranged for vertical movement by suitable control means, such as a pitch control lever 132 which corresponds in function to the pitch control lever 93 shown in Figure 8.

The telescoping shaft and universal joint connections just described permit direct drive connection between the motor and the rotor in all permissible positions of tilting movement of the mast relative to the fuselage.

Figures 12 and 13 show a modification of the automatic pitch control principle as applied to a 4-bladed rotor structure. As shown in Figure 12, two pairs of blades 11a, 11a and 11b, 11b, respectively, are disposed substantially at right angles to each other. The two pairs of blades are spaced longitudinally of the mast, indicated generally at 17a, so as to provide, in effect, two independent rotors, each having automatic pitch control. The two pairs of opposed blades are mounted for tilting movement relative to a rotating barrel 19a on independent axes, indicated at F—F and G—G in Figure 13. The two axes F—F and G—G are disposed at right angles to each other but spaced vertically of the barrel 19a.

The average or collective pitch of the two sets of blades is controlled simultaneously and to the same degree by a pitch control rod 70b, corresponding to the control rod 70 of Figure 6, but having two vertically spaced cross bars 65f and 65g, each arranged at right angles to their respective axes of tilting movement F—F and G—G. The lowermost cross bar 65g has its ends extending through upright slots 135 in the rotating barrel 19a. As will be seen from Figure 12, the upper pair of blades 11a have pitch control levers 60b, corresponding to the pitch control levers 60 of Figure 6, and the lower pair of blades 11b have corresponding pitch control levers 60c at right angles to the levers 60b.

From the preceding description of the 4-bladed rotor structure shown in Figures 12 and 13, it will be understood that each pair of blades 11a and 11b are tiltable independently of each other with respect to the mast axis, and each have their own automatic pitch control lever system, operating on the same principle as the 2-bladed form of rotor shown and described in connection with Figures 1 to 9, inclusive.

Figure 14 shows another modified form of the invention as applied to a 4-bladed rotor structure, in which two pairs of opposed blades 11c and 11d are rotated in opposite directions to each other. In this form of mechanism, power may be supplied from an inboard motor through a telescoping and universally jointed input drive shaft 137 at the lower end of the mast, although it will be manifest that the blades can be driven by jet engines at their outer ends, if desired.

With the form of inboard motor drive shown in Figure 14, the input drive shaft drives a hollow shaft 138 through a universal joint 139. A differential gear system, indicated generally at 140, is mounted near the lower end of the mast tube 18b. Said differential gear system may be of conventional form arranged to rotate a lower rotor drive shaft 141 in one direction and an upper rotor drive shaft 142 in the opposite direction at the same speed. The lower rotor drive shaft 141 surrounds the upper drive shaft 142 and is keyed at its upper end to a rotating barrel 19b, corresponding to the barrel 19 previously described in connection with Figure 6. The barrel 19b also has upstanding trunnion supports 22b, corresponding to the trunnion supports 22 of Figure 6, to which the lower pair of blades 11d are pivotally mounted for tilting movement on a transverse axis in substantially the same manner as with the 2-bladed construction previously described.

The upper rotor drive shaft 142 has a barrel-like support 19c mounted thereon provided with upwardly extending trunnion bearings 22c. This arrangement provides tilting support for the upper pair of rotor blades 11c, as the trunnion supports 22b do for the lower pair of blades 11d.

Automatic pitch control for the two pairs of rotors 11c and 11d is effected through similar sets of cross bars 65j and 65k and opposed pairs of pitch control levers 60j and 60k, respectively.

Average pitch control of the two sets of blades is effected simultaneously by a pitch control rod 70c passing downwardly through the upper rotor drive shaft 142, through the differential gearing 140, and into the upper end of shaft 138. Inasmuch as the latter shaft rotates in the same direction as the upper drive shaft 142, the pitch control rod 70c rotates with the upper drive shaft at all times. The position of the lower cross bar 65k may be adjusted vertically from the pitch control rod 70c by the same type of shifting device described in connection with Figure 11. Said shifting device includes a cross pin 145 connected to the rod 70c and passing through longitudinal slots 146 in the opposite walls of the upper drive shaft 142 above the barrel 19b by which the lower pair of blades 11d, 11d are driven. The outer ends of the cross pin 145 are engaged with the sleeve 147 slidably mounted on the upper drive shaft. Said sleeve is rotatably mounted in an outer shifting collar 148 which carries the cross bar 65k thereon. The outer ends of said cross bar are engaged with the pitch control lever 60k of the lower pair of blades, as previously described. Vertical adjustment of the pitch control rod 70c may be effected below the differential gearing 140 by a pitch control lever 149 having connection with the lower end of the pitch control rod through the same general form of cross pin and shifting collar, indicated generally at 150, as has just been described in connection with the shifting collar 148 for the cross bar 65k.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. In a rotary wing aircraft, a fuselage, a generally upright mast, a rotor structure including a support rotatably mounted on said mast, and a rotor hub mounted on said rotatable support for tilting movement on a single axis transverse to and intersecting the axis of rotation of said support, a pair of rotor blades mounted on said rotor hub for pitch adjustment on generally horizontal axes offset at opposite sides of the axis of rotation of the rotor hub and disposed at right angles to the transverse axis of tilting movement of the rotor relative to said rotating support, and control members rotatable with and projecting at opposite sides of said mast between the axes of pitch adjustment of said blades, and operatively connected to said blades for effecting inverse changes in the relative pitch of the two blades in response to tilting of the rotor hub relative to said mast, at angles of attack tending to return said blades and hub to right-angled relation to the mast.

2. An aircraft structure in accordance with claim 1, wherein the axes of pitch adjustment of said rotor blades are also disposed in substantially parallel relation to each other at equal distances from the axis of rotation of the rotor on the mast, and in the same horizontal plane as the transverse axis of tilting movement of the rotor hub relative to the mast, and the control members extend at right angles to the axis of tilting movement of the rotor hub, for effecting equal inverse changes in the relative pitch of the two blades.

3. An aircraft structure in accordance with claim 1, wherein the control members extend from opposite sides of the mast in a plane substantially at right angles to the axis of tilting movement of the hub on the support, and wherein the operative connection between each of said blades and the control members consists of a laterally extending lever on each blade pivotally connected with the end of one of said control members.

4. An aircraft structure in accordance with claim 3, wherein the control members are also adjustable vertically relative to said mast to control the collective pitch of the blades with respect to the rotor hub.

5. An aircraft structure in accordance with claim 4, wherein the control members are mounted on a rod concentric with and extending through said mast, and means for adjusting said rod are disposed at the lower end of said mast.

6. In a rotary wing aircraft, a fuselage, a multi-bladed rotor and a generally upright mast for supporting said rotor, a cradle rotatably supported on said mast, means for mounting said cradle and mast for universal tilting movement relative to said fuselage, including two pairs of horizontally and vertically elongated hinge plates and an intermediate yoke surrounding and spaced from said mast, one pair of hinge plates being hinged along their lower edges to said fuselage at opposite sides of said mast and along their upper edges to said yoke on elongated pivotal axes so as to limit lateral tilting of said yoke in one direction relative to the said fuselage, and the second pair of hinge plates being hinged along their lower edges to said yoke and along their upper edges to said cradle on elongated pivotal axes extending transversely to the hinged axes of the first pair of plates, so as to limit lateral tilting of said cradle relative to said yoke in a direction transverse to the direction of tilting of said yoke relative to the fuselage.

7. In a structure of claim 6, wherein the two pairs of hinge plates and their hinged axes are disposed respectively at equal distances from the vertical axis of said mast when the latter is in its central upright position.

8. In a structure of claim 7, wherein the pivotal connections of each pair of hinge plates are so disposed that tilting of the mast out of its central upright position will cause vertical movement of the center of thrust of the rotor toward the fuselage and substantially along the vertical axis of the mast as established when the latter is in its central upright position.

9. In a tilting mounting for a helicopter rotor mast, a pair of lower hinge plates pivotally mounted on said helicopter along their lower edges and extending upwardly and inwardly inclined equally spaced-apart relationship on opposite sides of the mast, a yoke surrounding and spaced from said mast having hinged connection with said lower hinge plates along the upper edges of the latter, a pair of upper hinge plates pivotally connected to said yoke along their lower edges and extending in upwardly and inwardly inclined equally spaced-apart relationship to the mast, said upper hinge plates being disposed for pivotal movement substantially at right angles to the swinging movement of said lower hinge plates, and a mast support pivotally mounted between the upper edges of said upper hinge plates.

10. In a structure of claim 9, wherein a rotor is rotatably mounted on the mast above the mast support and the pivotal connections of each pair of hinge plates are so disposed that tilting of the mast out of its central upright position will cause vertical movement of the center of thrust of the rotor toward the helicopter and substantially along the vertical axis of the mast as established when the latter is in its central upright position.

11. In a rotary wing aircraft, a fuselage, a rotor structure, rotatably mounted thereon for lifting the same, a mast including a support rotatable on a generally upright axis, a rotor having a hub mounted on said support for tilting movement on a single axis transverse to and intersecting the axis of rotation of said support, a pair of opposed rotor blades mounted on said rotor hub for pitch adjustment on generally horizontal axis extending transversally and substantially in the same horizontal plane as the axis of tilting of said hub on said support, a pair of control arms carried by said support, and projecting from the latter at fixed opposed horizontal angles offset circumferentially of the axis of tilting of said hub on said support, and lever means on said blades operatively connected with the ends of said control arms for effecting inverse changes in pitch adjustment of the two blades in response to tilting of said rotor relative to said support.

12. An aircraft structure in accordance with claim 11, wherein the control arms are adjustable vertically relative to the support to control the collective pitch of the blades with respect to the rotor hub.

13. An aircraft structure in accordance with claim 11 wherein the rotary support is mounted on a cradle having universal tilting movement relative to said fuselage, the universal mounting means including two pairs of vertically elongated hinge plates and an intermediate yoke surrounding and spaced from the mast, one pair of hinge plates being hinged at their upper ends to opposite sides of said cradle and at their lower ends to said yoke on elongated pivotal axes, and the second pair of hinge plates being hinged at their upper ends to said yoke and at their lower ends to said fuselage on elongated pivotal axes, said pairs of hinge plates and their respective hinged axes being disposed substantially at right angles to each other.

14. The structure of claim 13 wherein the pivotal connections of each pair of hinge plates are so disposed that tilting of the mast out of its central upright position will cause vertical movement of the center of thrust of the rotor toward the fuselage and substantially along the vertical axis of the mast as established when the latter is in its central upright position.

References Cited in the file of this patent

UNITED STATES PATENTS

| | | |
|---|---|---|
| 2,224,357 | Pecker | Dec. 10, 1940 |
| 2,569,882 | De Bothezat | Oct. 2, 1951 |
| 2,593,335 | Neale | Apr. 15, 1952 |
| 2,639,775 | Hunt | May 26, 1953 |
| 2,658,575 | Stone | Nov. 10, 1953 |
| 2,663,374 | Vandermeer | Dec. 22, 1953 |
| 2,689,011 | Zakhartchenko | Sept. 14, 1954 |

FOREIGN PATENTS

| | | |
|---|---|---|
| 580,109 | Great Britain | Aug. 27, 1946 |
| 605,085 | Great Britain | July 15, 1948 |
| 623,582 | Great Britain | May 19, 1949 |